April 3, 1951 A. V. LOUGHREN 2,547,648

AUTOMATIC CONTRAST CONTROL SYSTEM FOR TELEVISION APPARATUS

Original Filed Jan. 25, 1946 2 Sheets-Sheet 1

INVENTOR:
ARTHUR V. LOUGHREN,
BY Harry C. Page
ATTORNEY.

April 3, 1951 A. V. LOUGHREN 2,547,648

AUTOMATIC CONTRAST CONTROL SYSTEM FOR TELEVISION APPARATUS

Original Filed Jan. 25, 1946 2 Sheets-Sheet 2

INVENTOR:
ARTHUR V. LOUGHREN,

BY Harry C. Page

ATTORNEY.

Patented Apr. 3, 1951

2,547,648

UNITED STATES PATENT OFFICE 2,547,648

AUTOMATIC CONTRAST CONTROL SYSTEM FOR TELEVISION APPARATUS

Arthur V. Loughren, Great Neck, N. Y., assignor to Hazeltine Research, Inc., Chicago, Ill., a corporation of Illinois Continuation of application Serial No. 643,287, January 25, 1946. This application October 8, 1949, Serial No. 120,404

18 Claims. (Cl. 178—7.5)

Figure 1:
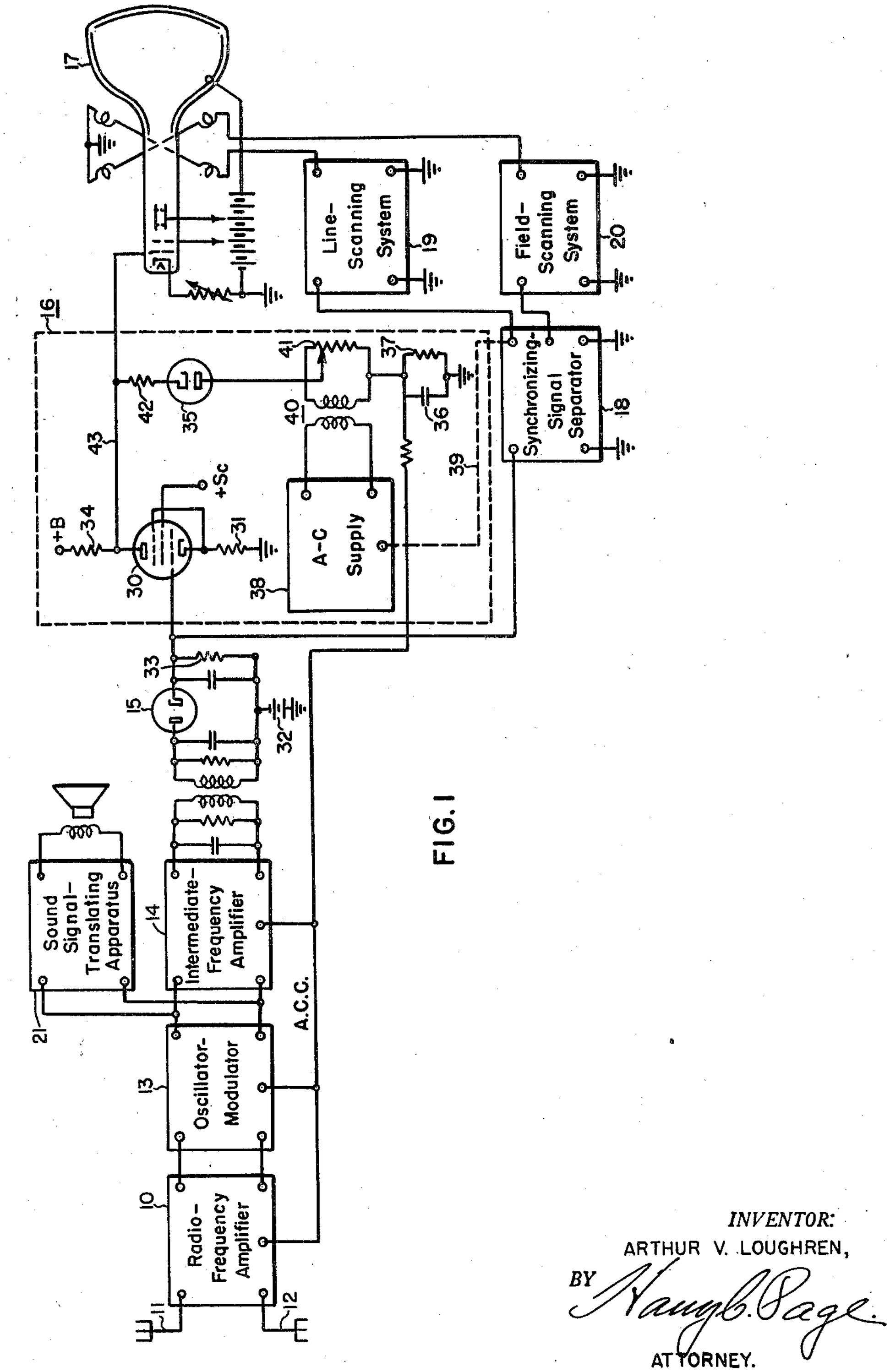

The present invention relates to systems for translating video signals of variable maximum amplitude or intensity and for developing a control signal suitable for controlling an operating characteristic of the system in accordance with the intensity of the translated signal. More particularly the present invention is directed to automatic-contrast-control systems for television apparatus. The present application is a continuation of application Serial No. 643,287, filed January 25, 1946, now abandoned, and entitled "Keyed Automatic Volume Control for Television." While the present invention is of general application and may be advantageously incorporated into transmitting as well as receiving systems, it is especially suited for providing in a receiver an automatic-contrast-control (A. C. C.) effect determined by the intensity of the incoming signal and substantially independent of its video or light-modulation components. For convenience of presentation, the invention is to be particularly described in that environment.

In present-day practice the composite television signal transmitted to a receiver comprises a carrier-wave signal modulated during recurrent trace periods with video-frequency and low-frequency or direct-current components, representing light variations in an image being transmitted and its average background illumination, respectively. During intervening retrace periods the carrier-wave signal is modulated with synchronizing-signal components. It is also customary to have some repeating component of the composite signal represent a fixed amplitude level that is at least equal to the greatest amplitude level of that signal utilized in transmitting video information. Consider, as an example, the so-called "negatively modulated" signal currently in use in this country.

A negatively modulated carrier-wave signal devotes a certain amplitude range, say between twenty and seventy-five per cent. of the maximum carrier amplitude, to the transmission of the video information, the lower limit of this range designating the white level and the upper limit corresponding to the black level. A decrease in carrier-wave amplitude within this range denotes an increase in illumination. The final portion of the carrier amplitude, or between seventy-five and one hundred per cent. of the maximum carrier amplitude, is assigned to the transmission of the synchronizing signals including line-frequency components which intervene succeeding line-trace periods and field-frequency components coming between successive field-trace periods. Since A. C. C. signals are usually derived from the line-synchronizing components, the field components may be neglected in the remainder of this discussion. Each line-frequency component extends from the black level of the video signal a fixed amount into the blacker-than-black region. Therefore, the negatively modulated signal usually includes two components, the black-level and the line-frequency synchronizing pulse, each of which represents a fixed amplitude level of the carrier at least equal to the greatest amplitude level used in carrying video information. After detection of the received signal, if the received direct-current component is retained, peak rectification of either of these components produces a potential independent of the video modulation and suitable for A. C. C. control purposes. Obviously, peak rectification of the line-frequency components is the more convenient and consequently has been resorted to extensively heretofore.

In one prior arrangement the A. C. C. system is immediately and directly coupled to the signal detector. While a usable control signal may be obtained in this fashion, the control may not be as sensitive as desired for certain installations. The sensitivity may be enhanced by applying the A. C. C. signal to the controlled circuits through a direct-current amplifier but this requires additional stages of amplification in the receiver.

Other prior A. C. C. systems comprise a narrow-band and an additional intermediate-frequency amplifier used exclusively for applying the received signal to the A. C. C. system. The narrow-band amplifier is used because of its inherent high gain which increases the sensitivity of the system but at the expense of an amplifying stage added to the receiver.

Still other prior systems are designed to respond to a "positively modulated" carrier-wave signal in which an increased amplitude within the range allotted to video information indicates an increased illumination. Also, the signal may include components recurring at the line frequency and having a fixed amplitude at least equal to the maximum white level. Peak rectification of these components in A. C. C. systems of the type referred to above enables a control signal to be obtained. However, such arrangements are subject to the same general limitations recited in the preceding paragraphs.

It is an object of this invention, therefore, to provide a television translating system which avoids one or more of the above-mentioned limitations of prior arrangements.

It is another object of the invention to provide an improved television system for translating video signals of variable maximum amplitude and for developing a control signal in accordance with the intensity of the translated signal.

It is a specific object of the invention to provide an improved system for translating video signals of variable maximum amplitude and for developing an automatic-contrast-control signal having an amplitude determined by the intensity of the translated signal but independent of its video modulation components.

In accordance with a particular form of the invention, a system for automatically controlling an operating characteristic of a television receiver while translating video signals of variable maximum amplitude which individually include recurrent reference components representing for each signal a fixed amplitude level at least equal to the greatest amplitude level of that signal utilized in transmitting video information comprises a direct-current electron-tube repeater having a load impedance and arranged faithfully to translate the above-mentioned video signals. The system further includes a direct-current series circuit including a rectifier conductively connected to the load impedance with such polarity that the reference components translated by the repeater are in a sense tending to render the rectifier conductive, an integrating load circuit for the rectifier, and means for supplying a periodic potential to the series circuit and having parameters so proportioned that the aforesaid periodic potential has an amplitude and periodicity effective to cause the rectifier to respond to the potential variations at the load impedance only during the occurrence of at least some of the reference components, thereby to develop in the load circuit a control signal having an amplitude determined by the amplitude of the last-mentioned reference components.

For a better understanding of the present invention, together with other and further objects thereof, reference is had to the following description taken in connection with the accompanying drawings, and its scope will be pointed out in the appended claims.

Figure 4:
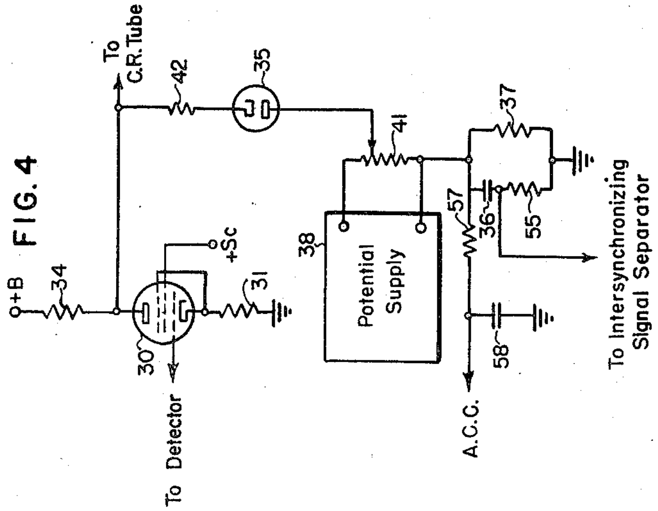
Figure 3:
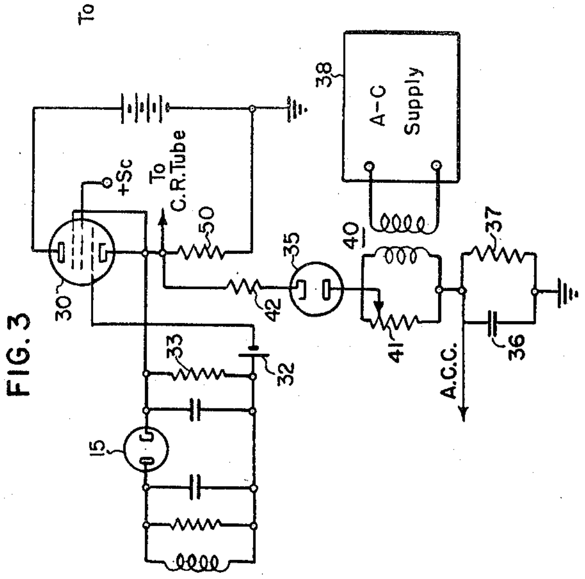
Figure 2:
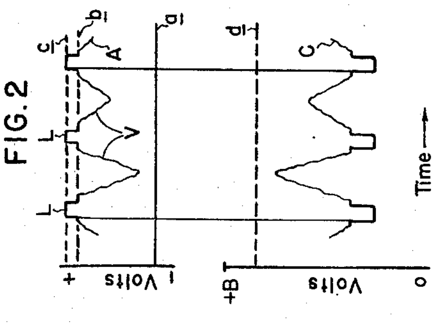

In the drawings, Fig. 1 is a circuit diagram, partly schematic, of a complete television carrier-signal receiver embodying the invention; Fig. 2 includes graphs used in explaining the operation of the invention; Fig. 3 is a circuit diagram of a portion of the Fig. 1 arrangement, illustrating a modified form of the invention; and Fig. 4 represents a further modification of the invention.

Referring now more particularly to Fig. 1, the television carrier-signal receiver there represented includes a radio-frequency amplifier 10 of any desired number of stages, having its input circuit connected to an antenna system 11, 12 and having its output circuit connected to an oscillator-modulator 13. Coupled in cascade with oscillator-modulator 13, in the order named, are an intermediate-frequency amplifier 14 of one or more stages, a detector 15, a video-frequency amplifier and A. C. C. supply 16 described more particularly hereinafter, and an image-reproducing device 17 of the cathode-ray tube type. There is also coupled to detector 15 a synchronizing-signal separator 18, having output circuits connected with a line-scanning system 19 and a field-scanning system 20. The output circuits of these scanning systems, in turn, are connected with appropriate beam-deflecting windings of tube 17. The output circuit of the A. C. C. supply included in unit 16 is connected to the input circuits of one or more of the tubes of radio-frequency amplifier 10, oscillator-modulator 13, and intermediate-frequency amplifier 14 in conventional manner.

A sound signal-translating apparatus 21 is also connected to the output circuit of oscillator-modulator 13 and may include one or more stages of intermediate-frequency amplification, a detector, one or more stages of audio-frequency amplification, and a sound-reproducing device.

It will be understood that the various units thus far described, with the exception of the video-frequency amplifier and A. C. C. supply 16, may be of conventional construction and operation. The details of such components are well known in the art, rendering further description thereof unnecessary. Considering briefly the operation of the receiver as a whole and neglecting for the moment the specific operation of unit 16, a desired modulated carrier-wave television signal is intercepted by antenna system 11, 12. This signal is selected and amplified in radio-frequency amplifier 10 and applied to oscillator-modulator 13 where it is converted to an intermediate-frequency signal. The intermediate-frequency signal is selectively amplified in amplifier 14 and is detected by detector 15 to derive the modulation components thereof. These modulation components, which comprise synchronizing-signal components and video-frequency components, are applied to the video-frequency amplifier of unit 16 for amplification and are thereafter applied to the brilliancy-control electrode of image reproducer 17 to modulate the intensity of the electron beam thereof in accordance with the video-frequency components. The synchronizing-signal components of the received signal are separated from the video-frequency components in separator 18 and are used to synchronize the operation of line-scanning and field-scanning systems 19 and 20, respectively. These systems generate scanning signals of saw-tooth wave form which are properly synchronized with reference to the received signal and are applied to the deflecting elements of the image reproducer, thereby to deflect the cathode-ray beam of tube 17 in two directions normal to each other to reproduce the received television image.

The automatic-contrast-control or A. C. C. signal derived in unit 16 is effective to control the amplification of one or more of units 10, 13, and 14 to maintain the signal input to detector 15 within a relatively narrow range for a wide range of received signal intensities.

The sound signal-modulated carrier wave accompanying the desired vision-modulated carrier-wave signal is also intercepted by antenna system 11, 12, selected and amplified in radio-frequency amplifier 10 and applied to oscillator-modulator 13 wherein it is converted to a sound-modulated intermediate-frequency signal. The sound-modulated intermediate-frequency carrier signal is applied to apparatus 21 wherein it is amplified and detected to derive the modulation components which are further amplified and reproduced by the sound-reproducing device.

Referring now more particularly to unit 16 which embraces salient features of the invention, the arrangement there represented comprises a direct-current electron-tube repeater such as vacuum-tube amplifier including a pentode-type tube 30 which has, among others, an anode, a cathode and a control electrode. The input electrodes of tube 30, which is arranged faithfully to translate the complete video signal, are coupled through a cathode resistor 31 and a bias source 32 to the load resistor 33 of detector 15, providing an input circuit for the amplifier having a direct-current connection with the detector. The amplifier has an anode load impedance 34 for connecting its output electrodes in series with a source of unidirectional potential of positive polarity, indicated +B. The opposite terminal of this source is grounded.

Unit 16 under consideration includes a diode rectifier 35 and an integrating load circuit for the rectifier provided by the parallel combination of a condenser 36 and a resistor 37, one terminal of this combination being grounded as illustrated. The unit also has means, including a periodic-potential-supply means, for connecting the rectifier with its load circuit in a direct-current series circuit more fully to be described hereinafter. While the potential-supply means referred to may be of any suitable well-known type, such as a battery source or an A.-C. supply with a rectifying system for deriving a unidirectional potential, in the embodiment under consideration it comprises an alternating-current potential-supply arrangement. This arrangement includes a supply 38, selected to generate an alternating-current signal which may have a frequency widely different from the repetition frequency of reference components included in the received modulated carrier-wave television signal and from which it is desired to obtain an A. C. C. control signal. Most conveniently, the line-synchronizing components are used for this purpose and, consequently, supply 38 may be considered as a generator having an operating frequency which is very high in comparison with the line frequency of the received signal. The output circuit of A.-C. supply 38 includes the primary winding of a transformer 40. The secondary winding of transformer 40 is terminated in a voltage divider 41. The anode electrode of rectifier 35 is conductively connected with the high-potential terminal of integrating circuit 36, 37 through the tap of this voltage divider. An isolating resistor 42 and a conductor 43 conductively connect the cathode of rectifier 35 to that terminal of the anode load impedance 34 which is connected to the anode of the amplifier 30. The resistor 42 and the conductor 43 thus constitute the remainder of the aforementioned means for connecting the rectifier with its integrating load circuit in a direct-current series circuit, which circuit may include at least a portion of the load impedance 34 and, for the described embodiment of the invention, includes that load impedance.

In considering the operation of unit 16, it is expedient first to determine the no-signal condition of load impedance 34, that is, the condition of this load in the absence of signals applied to the input circuit of amplifier 30. One terminal of impedance 34 is maintained substantially at the level of source +B while the other terminal is at a less positive potential, determined by the potential drop across the amplifier load. Assuming tube 30 normally to be in a conductive state, the low-potential terminal of impedance 34 is at a level which may be represented by horizontal line $d$ in Fig. 2. This is also the potential level of the anode of tube 30 and, consequently, variations in the anode potential may be examined to ascertain the potential variations of load impedance 34 from its no-signal condition occasioned by the translation of the signals through the amplifier.

Curve A of Fig. 2 shows a portion of the signal output of detector 15 and the signal applied to the input circuit of unit 16 in the presence of a received negatively modulated carrier-wave television signal of a given intensity. The horizontal line $a$ is the no-signal potential of the diode load circuit established by virtue of source 32. The potential variations of the load circuit in the presence of a received signal are in a positive sense or direction from this reference $a$. The portion of the detected signal illustrated includes video modulation components V as well as recurrent line-frequency synchronizing components L superimposed on the black level of the received signal in well-known manner. This signal also includes its received direct-current component so that the black level is at a fixed amplitude $b$, corresponding to the upper limit of the video range. The synchronizing pulses L are also aligned at a fixed level $c$, corresponding to the maximum amplitude of the received signal and representing a level which exceeds the highest amplitude level of the received signal utilized in transmitting video information. While the black level $b$ and synchronizing peak level $c$ are fixed for received signals of one intensity, they vary proportionally and in the same sense with variations in intensity of the intermediate-frequency signal.

By the term "maximum amplitude" is meant the greatest signal excursion from a fixed reference level. For the signal of curve A, the synchronizing pulses L represent the maximum amplitude and they extend in a positive direction from the reference $a$. Where an oppositely poled signal is derived from the detector, the synchronizing components again designate the maximum amplitude but extend in the opposite direction from the reference $a$. Viewed with respect to the received carrier-wave signal, the maximum amplitude is the greatest signal variation from the alternating-current axis.

The output signal A of the detector is amplified by the direct-current amplifier 30, establishing the potential variations of curve C at the anode thereof. These potential variations are applied through the direct-current connection 43 to the brilliancy-control electrode of the image reproducer 17 to modulate the cathode-ray beam thereof in accordance with the video modulation of the received and detected signal. The potential variations at the anode of tube 30, with reference to its no-signal level $d$, are in a sense tending to render rectifier 35 conductive. In other words, the translation of the detected signal causes the anode potential of tube 30 to be less positive than its no-signal value which is a potential variation in a negative direction and, as applied to the cathode of rectifier 35, is in a sense to render the rectifier conductive. The response of the rectifier to these potential variations is under the control of A.-C. supply 38 as will appear presently.

Preferably, A.-C. supply 38 controls rectifier 35 to peak rectify only the potential variations from the no-signal value $d$ resulting from the translation of the recurrent line-synchronizing components L. To this end, the discharge time constant of integrating circuit 36, 37 is chosen to be very long with reference to the periodicity of the line-synchronizing components. Additionally, the operating frequency of supply 38 is chosen to be so high in comparison with the repetition frequency of the line-synchronizing components L that at least one cycle of the potential supplied therefrom occurs within the duration of each line-synchronizing component. When there is to be no delayed A. C. C. action, the peak amplitude of the alternating-current potential generated in unit 38 is selected to be equal to the direct-current potential level *d* of the anode of amplifier 30.

When the described operating conditions are established in unit 16, supply 38 is effective to control rectifier 35 to respond only to anode-potential variations of tube 30 which result from the translation of the line-synchronizing components L, to peak rectify these variations and establish in integrating circuit 36, 37 an A. C. C. control potential of negative polarity. This may be more clear from a consideration of the potentials applied to the electrode elements of rectifier 35. The anode of tube 30, which is at a positive potential with reference to ground, effectively applies a positive bias potential to the cathode of the rectifier. The potential source 38 causes the anode of rectifier 35 to be positive with reference to ground during positive half cycles of the alternating-current potential. Since the positive peaks of this potential have a value corresponding to the bias applied to the cathode of rectifier 35 for the no-signal condition of amplifier 30 and occur at a very much higher repetition frequency than the line-synchronizing components L, there is a net positive potential on the anode of the rectifier some time during the translation of each such component by amplifier 30. The rectifier is thereby rendered conductive and rectifies the potential variations resulting from the translation of the line-synchronizing components. The resulting A. C. C. signal developed in the integrating load circuit 36, 37 has an amplitude determined by the amplitude of the line-synchronizing components and is suitable for controlling the gain characteristic of the receiver to maintain the signal input to detector 15 within a relatively narrow range for a wire range of received signal intensities. Consequently, the intensity of the signal applied to tube 17 is maintained within a narrow range of values, whereby the contrast of the reproduced image is substantially constant.

The voltage divider 41 is a contrast control which permits unit 16 to be adjusted for delayed A. C. C. action. This is accomplished by adjusting the maximum amplitude of the alternating-current potential applied to the anode of rectifier 35. When that peak amplitude is made much less than the no-signal anode potential *d* of amplifier 30, a very large potential variation of load impedance 34 is required before the diode 35 is rendered conductive to generate the A. C. C. signal. The voltage divider, therefore, when adjusted for delayed A. C. C. establishes an additional operating condition of the system which must be satisfied before the rectifier conducts, namely, the signal applied to the amplifier must have a maximum amplitude which exceeds a preselected minimum value.

In an alternative form of the invention, A.-C. supply 38 is taken directly from the 60-cycle source which feeds the power supply of the receiver. When this form is employed, the frequency of the alternating-current potential applied to the anode of rectifier 35 is very much less than the repetition frequency of the line-synchronizing components of the received signal. The operation of unit 16 with this arrangement of unit 38 is generally similar to that described in the preceding paragraphs except that not all of the line-synchronizing components are rectified in rectifier 35 in view of the wide frequency difference between the line-synchronizing components and the alternating-current signal applied to the anode of the rectifier. However, peak rectification is accomplished of at least some of the line-synchronizing components, namely those that occur within a substantial portion of the positive half cycles of the 60-cycle signal supplied by unit 38 and a satisfactory A. C. C. control potential is developed in the integrating circuit 36, 37. The amplitude of this signal is determined by the amplitude of the line components during operating intervals in which the rectifier is conductive.

The use of a 60-cycle signal obtained from the power supply of the receiver has the advantage that regulation of the power supply produces substantially identical effects on the potentials applied to the anode and cathode elements of rectifier 35. This is particularly desirable because it tends to render the critical potential levels of the electrode elements of rectifier 35 independent of regulation in the power-supply potential.

In some embodiments of the invention, synchronous operation of the A. C. C. system may be desired. It may be accomplished by employing for supply 38 a generator operated at the repetition frequency of the line-synchronizing components. Preferably, the generator has a synchronizing circuit connected to an output circuit of separator 18, as indicated by broken construction line 39. Also, such a generator may include a conventional phase-shifting circuit to permit adjusting the phase of the A.-C. potential supplied thereby with respect to the occurrence of the line-synchronizing components.

In utilizing the synchronous A. C. C. system, the peak amplitude of the output signal from supply 38 is selected to be equal to or less than the no-signal potential of the anode of tube 30. This selection is analogous to that mentioned above and is governed by whether or not the A. C. C. action is to be delayed. The output signal of supply 38 is phased to have its positive peaks occur in time coincidence with the line-synchronizing components. With these adjustments made, rectifier 35 may respond to and rectify each line-synchronizing component to derive the A. C. C. signal.

From the foregoing description, it will be understood that the alternating-current potential supplied to the anode of rectifier 35 may have the same frequency or a widely different frequency from that of the synchronizing-signal components to be utilized in deriving the A. C. C. control signal. However, when the alternating-current potential is of the same frequency as the line components, precautions must be taken properly to phase these signals. On the other hand, in using an A.-C. potential of a widely different frequency than the line-synchronizing components, diode 35 must be operated as a peak detector.

Fig. 3 represents a further modification of a video-frequency amplifier and A. C. C. supply, in accordance with the invention, coupled to the signal detector 15. This modification is similar to the detector and unit 16 of Fig. 1, like components thereof being designated by the same reference characters. In Fig. 3, the cathode of tube 30 is directly coupled with load resistor 33 of the detector while the control electrode is coupled to the detector through bias source 32. The load impedance 50 of the amplifier is included in the cathode circuit but is excluded from the input circuit of the tube to avoid degenerative effects. The amplified video-frequency signal obtained from load 50 may be applied directly to the brilliancy-control electrode of cathode-ray tube 17 as indicated.

In the operation of this modification, the alternating-current potential supplied by source 38 may have a peak value equal to the no-signal potential drop of load impedance 50 which constitutes a bias on diode 35. For delayed A. C. C. action, the peak value of the alternating-current potential is selected to be much less. In either case, the desired A. C. C. control signal is developed in integrating circuit 36, 37 in substantially the same manner as that described in connection with Fig. 1.

Unit 16 may be further modified, as represented schematically in Fig. 4, to constitute a separator suitable for deriving the synchronizing components of the received television signal. This modification is generally similar to Fig. 1 and corresponding components are designated by the same reference characters. The integrating load circuit of diode 35 includes an additional resistor 55 in series with condenser 36. Portion 36, 55 of the load circuit has a time constant short with respect to the periodicity of the line-synchronizing components while the time constant of the portion 36—37—55 is long with reference to this periodicity. A filter, including a resistor 57 and condenser 58, is provided for smoothing the A. C. C. signal. Potential supply 38 is selected to supply a signal having a peak value equal to the no-signal anode potential of tube 30. The supply 38 may be a direct-current source or an alternating-current source. If the latter is used, the operating frequency may be very high with respect to the line frequency of the received signal, or it may be equal to the line frequency in which case a phase shifter may be included in the supply as explained above.

When the arrangement of Fig. 4 is substituted for unit 16 of Fig. 1, the separator 18 is replaced by an intersynchronizing-signal separator. The input circuit of the separator is connected to the high-potential terminal of resistor 55, no other connection being made to the separator from detector 15.

The operation of the Fig. 4 arrangement in producing an A. C. C. signal is substantially as described in connection with Fig. 1 and need not be repeated. It will be evident that the rectification of diode 35 in establishing the A. C. C. control signal causes a pulse of charging current to flow through resistor 55 with the occurrence of each synchronizing component of the received signal. The resulting potential variations across resistor 55 correspond approximately with the wave form of the synchronizing components. Therefore, such components are derived from resistor 55 for application to intersynchronizing-signal separator 18.

In the described embodiments of the invention, the video signal with its received direct-current component is amplified before being introduced to the A. C. C. diode. This provides a more sensitive control system and is achieved without the necessity of adding additional stages of amplification to the receiver. Also, the positive terminal of integrating circuit 36, 37 is grounded so that the A. C. C. control signal is of negative polarity and at a desired direct-current reference level.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for automatically controlling an operating characteristic of a television receiver while translating video signals of variable maximum amplitude which individually include recurrent reference components representing for each signal a fixed amplitude level at least equal to the greatest amplitude level of that signal utilized in transmitting video information comprising: a direct-current electron-tube repeater arranged faithfully to translate said video signals and having a load impedance; and a direct-current series circuit including a rectifier conductively connected to said load impedance with such polarity that said reference components translated by said repeater are in a sense tending to render said rectifier conductive, an integrating load circuit for said rectifier, and means for supplying a periodic potential to said series circuit and having parameters so proportioned that said periodic potential has an amplitude and periodicity effective to cause said rectifier to respond to the potential variations at said load impedance only during the occurrence of at least some of said reference components, thereby to develop in said load circuit a control signal having an amplitude determined by the amplitude of said last-mentioned reference components.

2. A system for automatically controlling an operating characteristic of a television receiver while translating video signals of variable maximum amplitude which individually include recurrent reference components representing for each signal a fixed amplitude level at least equal to the greatest amplitude level of that signal utilized in transmitting video information comprising: a direct-current electron-tube repeater arranged faithfully to translate said complete video signals and having a load impedance; and a direct-current series circuit including a rectifier conductively connected to said load impedance with such polarity that said reference components translated by said repeater are in a sense tending to render said rectifier conductive, an integrating load circuit for said rectifier having a discharge time constant long with reference to the periodicity of said reference components, and means for supplying a periodic potential to said series circuit and having parameters so proportioned that said periodic potential has an amplitude and periodicity effective to cause said rectifier to peak-rectify the potential variations at said load impedance only during the occurrence of at least some of said reference components, thereby to develop in said load circuit a control signal having an amplitude determined only by the amplitude of said last-mentioned reference components.

3. A system for automatically controlling an operating characteristic of a television receiver while translating video signals of variable maximum amplitude which individually include recurrent reference components representing for each signal a fixed amplitude level at least equal to the greatest amplitude level of that signal utilized in transmitting video information comprising: a direct-current electron-tube repeater arranged faithfully to translate said complete video signals and having a load impedance; and a direct-current series circuit including a rectifier conductively connected to said load impedance with such polarity that said reference components translated by said repeater are in a sense tending to render said rectifier conductive, an integrating load circuit for said rectifier, and means for supplying a periodic potential to said series circuit and having parameters so proportioned that said periodic potential has a periodicity widely different from that of said reference components and an amplitude which jointly are effective to cause said rectifier to respond to the potential variations at said load impedance only during the occurrence of at least some of said reference components, thereby to develop in said load circuit a control signal having an amplitude determined only by the amplitude of said last-mentioned reference components.

4. A system for automatically controlling an operating characteristic of a television receiver while translating video signals of variable maximum amplitude which individually include recurrent reference components representing for each signal a fixed amplitude level at least equal to the greatest amplitude level of that signal utilized in transmitting video information comprising: a direct-current electron-tube repeater arranged faithfully to translate said complete video signals and having a load impedance; a rectifier conductively connected to said load impedance; a load circuit for said rectifier; means for supplying a periodic potential; and a direct-current series circuit including said rectifier, said load circuit, and said supply means, said supply means having parameters so proportioned that said periodic potential has an amplitude and periodicity effective to cause said rectifier to respond to the potential variations at said load impedance only during the occurrence of at least some of said reference components, thereby to develop in said load circuit a control signal having an amplitude determined only by the amplitude of said last-mentioned reference components.

5. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having an input circuit and a load impedance; means for applying said signals to said input circuit with such polarity that potential variations of said impedance resulting from the translation of said reference components are in a negative direction; a unidirectional rectifier having a cathode and an anode; an integrating load circuit for said rectifier having two terminals one of which is maintained at a fixed reference potential; a potential supply; and circuit connections completing a direct-current circuit including in series at least a portion of said load impedance, said rectifier, said load circuit and said potential supply and in which said rectifier cathode is coupled to said impedance and said rectifier anode is coupled to the other terminal of said load circuit; the amplitude time characteristic and maximum value of the potential applied to said series circuit by said potential supply being so selected that the net potential applied to said rectifier causes current flow in said circuit only during the translation of at least some of said reference components of said video signals.

6. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having an input circuit and a load impedance; means for applying said signals to said input circuit with such polarity that potential variations of said impedance resulting from the translation of said reference components are in a negative direction; a unidirectional rectifier having a cathode and an anode; an integrating load circuit for said rectifier having two terminals one of which is maintained at a fixed reference potential; a potential supply; circuit connections completing a direct-current circuit including in series at least a portion of said load impedance, said rectifier, said load circuit and said potential supply and in which said rectifier cathode is coupled to said impedance and said rectifier anode is coupled to the other terminal of said load circuit; the amplitude time characteristic and maximum value of the potential applied to said series circuit by said potential supply being so selected that the net potential applied to said rectifier causes current flow in said circuit only during the translation of said reference components of said video signals; and means for utilizing the potential developed by rectification in said load circuit to control the gain characteristic of said system.

7. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having an input circuit and a load impedance; means for applying said signals to said input circuit with such polarity that potential variations of said impedance resulting from the translation of said reference components are in a negative direction; a unidirectional rectifier having a cathode and an anode; an integrating load circuit for said rectifier having two terminals one of which is maintained at a fixed reference potential; an alternating-potential supply; and circuit connections completing a direct-current circuit including in series at least a portion of said load impedance, said rectifier, said load circuit and said potential supply and in which said rectifier cathode is coupled to said impedance and said rectifier anode is coupled to the other terminal of said load circuit; the frequency and peak value of the potential applied to said series circuit by said potential supply being so selected that the net potential applied to said rectifier causes current flow in said circuit only during the translation of said reference components of said video signals.

8. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having an input circuit and a load impedance; means for applying said signals to said input circuit with such polarity that potential variations of said impedance resulting from the translation of said reference components are in a negative direction; a unidirectional rectifier having a cathode and an anode; an integrating load circuit for said rectifier having two terminals one of which is maintained at a fixed reference potential; a potential supply for providing an alternating potential of adjustable peak amplitude; and circuit connections completing a direct-current circuit including in series at least a portion of said load impedance, said rectifier, said load circuit and said potential supply and in which said rectifier cathode is coupled to said impedance and said rectifier anode is coupled to the other terminal of said load circuit; the frequency and peak value of the potential applied to said series circuit by said potential supply being so selected that the net potential applied to said rectifier causes current flow in said circuit only during the translation of said reference components of said video signals.

9. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having an input circuit and a load impedance; means for applying said signals to said input circuit with such polarity that potential variations of said impedance resulting from the translation of said reference components are in a negative direction; a unidirectional rectifier having a cathode and an anode; an integrating load circuit for said rectifier having two terminals one of which is maintained at a fixed reference potential; a potential supply for providing an alternating potential having a synchronized relation with respect to said reference components; and circuit connections completing a direct-current circuit including in series at least a portion of said load impedance, said rectifier, said load circuit and said potential supply and in which said rectifier cathode is coupled to said impedance and said rectifier anode is coupled to the other terminal of said load circuit; the phasing and peak value of the potential applied to said series circuit by said potential supply being so selected that the net potential applied to said rectifier causes current flow in said circuit only during the translation of at least some of said reference components of said video signals.

10. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having an input circuit and a load impedance; means for applying said signals to said input circuit with such polarity that potential variations of said impedance resulting from the translation of said reference components are in a negative direction; a unidirectional rectifier having a cathode and an anode; an integrating load circuit for said rectifier having two terminals one of which is maintained at a fixed reference potential and having a discharge time constant long relative to the period of recurrence of said reference components; a potential supply for providing an alternating potential having a frequency widely different from the repetition frequency of said reference components; and circuit connections completing a direct-current circuit including in series at least a portion of said load impedance, said rectifier, said load circuit and said potential supply and in which said rectifier cathode is coupled to said impedance and said rectifier anode is coupled to the other terminal of said load circuit; the peak value of the potential applied to said series circuit by said potential supply being so selected that the net potential applied to said rectifier causes current flow in said circuit only during the translation of at least some of said reference components of said video signals.

11. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having an input circuit and a load impedance; means for applying said signals to said input circuit with such polarity that potential variations of said impedance resulting from the translation of said reference components are in a negative direction; a unidirectional rectifier having a cathode and an anode; an integrating load circuit for said rectifier having two terminals one of which is maintained at a fixed reference potential and having a discharge time constant long relative to the period of recurrence of said reference components; a potential supply for providing an alternating potential having a frequency high with respect to the repetition frequency of said reference components; and circuit connections completing a direct-current circuit including in series at least a portion of said load impedance, said rectifier, said load circuit and said potential supply and in which said rectifier cathode is coupled to said impedance and said rectifier anode is coupled to the other terminal of said load circuit; the peak value of the potential applied to said series circuit by said potential supply being so selected that the net potential applied to said rectifier causes current flow in said circuit only during the translation of at least some of said reference components of said video signals.

12. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having an input circuit and a load impedance; means for applying said signals to said input circuit with such polarity that potential variations of said impedance resulting from the translation of said reference components are in a negative direction; a unidirectional rectifier having a cathode and an anode; an integrating load circuit for said rectifier having two terminals one of which is maintained at a fixed reference potential and having a discharge time constant long relative to the period of recurrence of said reference components; a potential supply for providing an alternating potential having a frequency much less than the repetition frequency of said reference components; and circuit connections completing a direct-current circuit including in series at least a portion of said load impedance, said rectifier, said load circuit and said potential supply and in which said rectifier cathode is coupled to said impedance and said rectifier anode is coupled to the other terminal of said load circuit; the peak value of the potential applied to said series circuit by said potential supply being so selected that the net potential applied to said rectifier causes current flow in said circuit only during the translation of at least some of said reference components of said video signals.

13. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having an input circuit and a load impedance; means for applying said signals to said input circuit with such polarity that potential variations of said impedance resulting from the translation of said reference components are in a negative direction; a unidirectional rectifier having a cathode and an anode; an integrating load circuit for said rectifier having two terminals one of which is maintained at a fixed reference potential and having a discharge time constant long relative to the period of recurrence of said reference components; a potential supply; and circuit connections completing a direct-current circuit including in series at least a portion of said load impedance, said rectifier, said load circuit and said potential supply and in which said rectifier cathode is coupled to said impedance and said rectifier anode is coupled to the other terminal of said load circuit; the amplitude time characteristic and maximum value of the potential applied to said series circuit by said potential supply being so selected that the net potential applied to said rectifier causes current flow in said circuit only during the translation of said reference components of said video signals.

14. A system for automatically controlling an operating characteristic of a television apparatus while translating video signals of variable maximum amplitude which include a direct-current component and recurrent synchronizing components representing for each signal an amplitude level exceeding the greatest amplitude level of that signal utilized in transmitting video information comprising: a direct-current vacuum-tube amplifier arranged faithfully to translate said video signal including said direct-current components and said recurrent reference components thereof and having an input circuit and a load impedance; means for applying said signals to said input circuit with such polarity that potential variations of said impedance resulting from the translation of said reference components are in a negative direction; a unidirectional rectifier having a cathode and an anode; an integrating load circuit for said rectifier having two terminals one of which is maintained at a fixed reference potential, said load circuit including a first portion having a discharge time constant short relative to the period of recurrence of said synchronizing components and including a second portion having a discharge time constant long relative to said period; a potential supply; and circuit connections completing a direct-current circuit including in series at least a portion of said load impedance, said rectifier, said load circuit and said potential supply and in which said rectifier cathode is coupled to said impedance and said rectifier anode is coupled to the other terminal of said load circuit; the amplitude time characteristic and maximum value of the potential applied to said series circuit by said potential supply being so selected that the net potential applied to said rectifier causes current flow in said circuit only during the translation of said reference components of said video signals, whereby a gain-control potential is developed by rectification across said first portion of said load circuit and said synchronizing components are developed by rectification across said second portion thereof.

15. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having an input circuit and a load impedance; means for applying said signals to said input circuit with such polarity that potential variations of said impedance resulting from the translation of said reference components are in a negative direction; a unidirectional rectifier having a cathode conductively connected to said impedance and having an anode; an integrating load circuit for said rectifier having two terminals one of which is maintained at a fixed reference potential; a potential supply establishing a conductive connection between said rectifier anode and the other terminal of said load circuit; and circuit connections completing a direct-current circuit including in series at least a portion of said load impedance, said rectifier, said load circuit and said potential supply; the amplitude time characteristic and maximum value of the potential applied to said series circuit by said potential supply being so selected that the net potential applied to said rectifier causes current flow in said circuit only during the translation of said reference components of said video signals.

16. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having input and output circuits and having a load impedance included only in said output circuit; means for applying said signals to said input circuit with such polarity that potential variations of said impedance resulting from the translation of said reference components are in a negative direction; a unidirectional rectifier having a cathode conductively connected to said impedance and having an anode; an integrating load circuit for said rectifier having two terminals one of which is maintained at a fixed reference potential; a potential supply establishing a conductive connection between said rectifier anode and the other terminal of said load circuit; and circuit connections completing a direct-current circuit including in series at least a portion of said load impedance, said rectifier, said load circuit and said potential supply; the amplitude time characteristic and maximum value of the potential applied to said series circuit by said potential supply being so selected that the net potential applied to said rectifier causes current flow in said circuit only during the translation of said reference components of said video signals.

17. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having input and output circuits and having a load impedance included only in said output circuit; means for applying said signals to said input circuit with such polarity that potential variations of said impedance resulting from the translation of said reference components are in a negative direction; a unidirectional rectifier having a cathode conductively connected to said impedance and having an anode; an integrating load circuit for said rectifier having two terminals one of which is maintained at a fixed reference potential and having a discharge time constant long relative to the period of said reference components; a potential supply establishing a conductive connection between said rectifier anode and the other terminal of said load circuit for providing a potential having a maximum amplitude substantially equal to the potential applied to said rectifier cathode by said impedance in the absence of said video signals; and circuit connections completing a direct-current circuit including in series at least a portion of said load impedance, said rectifier, said load circuit and said potential supply; the amplitude time characteristic of the potential applied to said series circuit by said potential supply being so selected that the net potential applied to said rectifier causes current flow in said circuit only during the translation of said reference components of said video signals.

18. A system for automatically controlling an operating characteristic of a television apparatus while translating video signals of variable maximum amplitude which include a direct-current component and recurrent reference components representing for each signal an amplitude level at least equal to the greatest amplitude level of that signal utilized in transmitting video information comprising: a direct-current vacuum-tube amplifier arranged faithfully to translate said video signal including said direct-current components and said recurrent reference components thereof and having an input circuit and a load impedance; means for applying said signals to said input circuit with such polarity that potential variations of said impedance resulting from the translation of said reference components are in a negative direction; a unidirectional rectifier having a cathode and an anode; an integrating load circuit for said rectifier having two terminals one of which is maintained at a fixed reference potential; a potential supply; and circuit connections completing a direct-current circuit including in series at least a portion of said load impedance, said rectifier, said load circuit and said potential supply and in which said rectifier cathode is coupled to said impedance and said rectifier anode is coupled to the other terminal of said load circuit; the amplitude time characteristic and maximum value of the potential applied to said series circuit by said potential supply being so selected that the net potential applied to said rectifier causes current flow in said circuit only during the translation of those reference components of said video signals which have a maximum amplitude exceeding a preselected amplitude level.

ARTHUR V. LOUGHREN.

(References on following page)

REFERENCES CITED

The following references are of record in the file of this patent:

UNITED STATES PATENTS

| Number | Name | Date |
|---|---|---|
| 2,135,560 | Carlson | Nov. 8, 1938 |
| 2,135,942 | Koch | Nov. 8, 1938 |
| 2,224,134 | Blumlein | Dec. 10, 1940 |
| 2,227,026 | Schlesinger | Dec. 31, 1940 |
| 2,244,240 | Blumlein | June 3, 1941 |
| 2,259,538 | Wheeler | Oct. 21, 1941 |
| 2,296,393 | Martinelli | Sept. 22, 1942 |
| 2,299,944 | Blumlein | Oct. 27, 1942 |
| 2,299,945 | Wendt | Oct. 27, 1942 |
| 2,303,909 | Blumlein | Dec. 1, 1942 |
| 2,307,218 | Hardwich | Jan. 5, 1943 |
| 2,307,375 | Blumlein et al. | Jan. 5, 1943 |
| 2,307,387 | Blumlein | Jan. 5, 1943 |
| 2,328,946 | Blumlein | Sept. 7, 1943 |
| 2,469,606 | Mayle | May 10, 1949 |

FOREIGN PATENTS

| Number | Country | Date |
|---|---|---|
| 505,899 | Great Britain | May 15, 1939 |